United States Patent
Bedard et al.

(10) Patent No.: US 10,766,568 B1
(45) Date of Patent: Sep. 8, 2020

(54) SNOWMOBILE

(71) Applicant: BOMBARDIER RECREATIONAL PRODUCTS INC., Valcourt (CA)

(72) Inventors: Yvon Bedard, Orford (CA); Jonathan Fortier, Lawrenceville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/744,954

(22) Filed: Jan. 16, 2020

Related U.S. Application Data

(63) Continuation of application No. 16/404,831, filed on May 7, 2019, now Pat. No. 10,569,834, which is a
(Continued)

(51) Int. Cl.
*B62M 9/10* (2006.01)
*B62D 55/07* (2006.01)
(Continued)

(52) U.S. Cl.
CPC ........... *B62M 9/105* (2013.01); *B62B 13/046* (2013.01); *B62D 55/07* (2013.01); *B62D 55/12* (2013.01);
(Continued)

(58) Field of Classification Search
CPC .................................................. B62M 9/105; B62M 27/02; B62M 2027/021; B62B 13/046; B62D 55/07; B62D 55/12
See application file for complete search history.

(56) References Cited

U.S. PATENT DOCUMENTS

| 3,667,562 | A | | 6/1972 | Compton |
| 3,756,334 | A | * | 9/1973 | Williams ............... B62M 27/02 180/192 |

(Continued)

FOREIGN PATENT DOCUMENTS

| CA | 2883734 A1 | 9/2016 |
| CA | 2902973 C | 10/2016 |

(Continued)

OTHER PUBLICATIONS

Snoriders, 2017: Year of the snow bikes?, retrieved from http://snoriderswest.com/article/general/2017_year_of_the_snow_bikes on Jun. 15, 2017.
(Continued)

*Primary Examiner* — Bryan A Evans
(74) *Attorney, Agent, or Firm* — BCF LLP

(57) ABSTRACT

A snowmobile has a frame, a ski connected to the frame, a seat connected to the frame for accommodating a driver of the snowmobile, a rear suspension assembly operatively connected to the frame, an endless track supported by the rear suspension assembly, a motor supported by the frame, and a continuously variable transmission (CVT) operatively connecting the motor to the endless track. The rear suspension assembly has a suspension assembly drive axle defining a drive axle rotation axis, and a drive sprocket mounted to the drive axle. The motor has a shaft rotatable about a shaft rotation axis. The drive axle rotation axis is positioned forwardly of the shaft rotation axis. The seat is positioned above the motor.

20 Claims, 9 Drawing Sheets

Related U.S. Application Data continuation of application No. 16/029,278, filed on Jul. 6, 2018, now Pat. No. 10,293,883.

(60) Provisional application No. 62/529,244, filed on Jul. 6, 2017.

(51) Int. Cl.
  *B62D 55/12* (2006.01)
  *B62B 13/04* (2006.01)
  *B62M 27/02* (2006.01)

(52) U.S. Cl.
  CPC ....... *B62M 27/02* (2013.01); *B62M 2027/021* (2013.01)

(56) References Cited

U.S. PATENT DOCUMENTS

| | | | |
|---|---|---|---|
| 3,779,326 A | 12/1973 | Trautwein | |
| 3,783,958 A | 1/1974 | Canavan | |
| 3,822,755 A | 7/1974 | Hine | |
| 4,146,101 A | 3/1979 | Plourde | |
| 4,204,581 A | 5/1980 | Husted | |
| 4,244,436 A | 1/1981 | Condon et al. | |
| 4,434,867 A | 3/1984 | Grinde | |
| 4,437,534 A | 3/1984 | Grinde | |
| 4,442,913 A | 4/1984 | Grinde | |
| 4,502,560 A | 3/1985 | Hisatomi | |
| 4,613,006 A | 9/1986 | Moss et al. | |
| 4,714,125 A | 12/1987 | Stacy, Jr. | |
| 4,719,983 A | 1/1988 | Bruzzone | |
| 4,823,903 A | 4/1989 | Bibollet et al. | |
| 5,064,208 A | 11/1991 | Bibollet | |
| 5,203,424 A | 4/1993 | Gogo et al. | |
| 5,332,058 A | 7/1994 | Bianco | |
| 5,474,146 A | 12/1995 | Yoshioka et al. | |
| 5,829,545 A | 11/1998 | Yamamoto et al. | |
| 5,904,217 A | 5/1999 | Yamamoto et al. | |
| 5,947,220 A | 9/1999 | Oka | |
| 6,112,840 A | 9/2000 | Forbes | |
| 6,164,670 A | 12/2000 | Abarca et al. | |
| 6,170,589 B1 | 1/2001 | Kawano et al. | |
| 6,234,263 B1 | 5/2001 | Boivin | |
| 6,283,254 B1 | 9/2001 | Bibollet | |
| 6,302,232 B1 | 10/2001 | Forbes | |
| 6,321,864 B1 | 11/2001 | Forbes | |
| 6,382,338 B1 | 5/2002 | Forbes | |
| 6,431,301 B1 | 8/2002 | Forbes | |
| 6,626,258 B1 | 9/2003 | Forbes | |
| 6,708,791 B2 | 3/2004 | Alexander | |
| 7,182,165 B1 | 2/2007 | Keinath et al. | |
| 7,188,693 B2 | 3/2007 | Girouard et al. | |
| 7,357,201 B2 | 4/2008 | Jordan | |
| 7,455,141 B2 | 11/2008 | Hildebrand | |
| 7,475,751 B2 | 1/2009 | Pard et al. | |
| 7,789,183 B2 | 9/2010 | Sadakuni et al. | |
| 8,016,064 B2 | 9/2011 | Lucarelli | |
| 8,813,889 B1 | 8/2014 | Jorgenson | |
| 8,910,738 B2 | 12/2014 | Mangum | |
| 9,469,327 B2 | 10/2016 | Anderson et al. | |
| D778,783 S | 2/2017 | Will et al. | |
| 9,643,684 B2 | 5/2017 | Will et al. | |
| 9,751,552 B2 | 9/2017 | Mangum et al. | |
| 2003/0159868 A1 | 8/2003 | Alexander | |
| 2006/0213700 A1 | 9/2006 | Hildebrand | |
| 2008/0017431 A1 | 1/2008 | Sadakuni et al. | |
| 2011/0094814 A1 | 4/2011 | Nagao et al. | |
| 2011/0139528 A1 | 6/2011 | Eaton et al. | |
| 2015/0144412 A1 | 5/2015 | Mangum | |
| 2015/0259032 A1 | 9/2015 | Mangum | |
| 2016/0167722 A1 | 6/2016 | Anderson et al. | |
| 2016/0257332 A1 | 9/2016 | Hodgson et al. | |
| 2016/0280331 A1 | 9/2016 | Mangum | |
| 2017/0066502 A1* | 3/2017 | Will | B62M 9/06 |
| 2017/0129526 A1 | 5/2017 | Mangum et al. | |
| 2017/0129569 A1 | 5/2017 | Mangum et al. | |
| 2017/0129570 A1 | 5/2017 | Mangum et al. | |
| 2017/0217540 A1 | 8/2017 | Sawai et al. | |

FOREIGN PATENT DOCUMENTS

| | | |
|---|---|---|
| EP | 0997372 A2 | 5/2000 |
| WO | 2017031591 A1 | 3/2017 |
| WO | 2017031592 A1 | 3/2017 |
| WO | 2017079503 A1 | 5/2017 |

OTHER PUBLICATIONS

Camso, DTS 129, retrieved from https://camso.co/en/products-solutions/atv-utv/products/dts-129 on Jun. 15, 2017.

English Abstract of EP0997372A2 retrieved from https://worldwide.espacenet.com/ on Jul. 4, 2018.

* cited by examiner

SNOWMOBILE

CROSS-REFERENCE

The present application is a continuation of U.S. patent application Ser. No. 16/404,831, filed on May 7, 2019, which is a continuation of U.S. patent application Ser. No. 16/029,278, filed on Jul. 6, 2018, which claims priority to U.S. Provisional Patent Application No. 62/529,244, filed on Jul. 6, 2017, the entirety of each of which is incorporated herein by reference.

TECHNICAL FIELD

The present invention relates generally to a snowmobile, and in particular to a configuration of its motor and transmission.

BACKGROUND

Snowmobiles are designed for travel over snow on a variety of terrains. However, due to its size, a snowmobile may be restricted from navigating areas where obstacles (e.g., vegetation) are dense. Notably, the snowmobile typically includes two laterally-spaced skis which impart a significant width to the snowmobile such that maneuvering between obstacles may be difficult. In order to address this, in some snowmobiles, the skis can be adjusted to be positioned closer to one another. Nevertheless, certain components of the snowmobile's powertrain may still impose a significant width to the snowmobile.

In some cases, a motorcycle may be adapted to travel over snow by replacing its front and rear wheels by a ski and a tracked suspension assembly respectively, thus resulting in a relatively narrow vehicle capable of travelling over snow. However, motorcycles are generally not optimized for winter use and may thus exhibit poor performance when modified as described. For example, due to the configuration of the motorcycle's powertrain (including, for example, its engine and transmission), the weight distributed on the ski and the tracked suspension assembly may not be optimal for travelling over snow. Furthermore, certain components, such as the motorcycle's transmission, may not be suited for interaction with snow.

For these and other reasons, there is a desire for modification to existing snowmobile designs.

SUMMARY

It is an object of the present invention to ameliorate at least some of the inconveniences described above.

In accordance with an aspect of the present technology, there is provided a snowmobile. The snowmobile includes: a frame; a ski connected to the frame; a seat connected to the frame for accommodating a driver of the snowmobile; a rear suspension assembly operatively connected to the frame; an endless track supported by the rear suspension assembly; a motor supported by the frame; and a continuously variable transmission (CVT) operatively connecting the motor to the endless track for driving the endless track. The rear suspension assembly includes: at least one slide rail; a suspension assembly drive axle defining a drive axle rotation axis; a drive sprocket mounted to the drive axle; and a plurality of idler wheels connected to the at least one slide rail. The drive sprocket of the rear suspension assembly is rotatable about the drive axle rotation axis to drive the endless track. The motor includes a shaft rotatable about a shaft rotation axis. The drive axle rotation axis is positioned forwardly of the shaft rotation axis of the shaft of the motor. The seat is positioned above the motor.

In some implementations, the CVT includes a primary pulley operatively connected to and driven by the motor, a secondary pulley operatively connected to and driven by the primary pulley, and a transmission belt connecting the primary pulley to the secondary pulley. The primary pulley is rotatable about a primary pulley rotation axis, the primary pulley rotation axis extending parallel to the shaft rotation axis of the shaft of the motor, the primary pulley being operatively connected to the shaft of the motor by one of a chain and a belt. The secondary pulley is rotatable about a secondary pulley rotation axis. The secondary pulley is operatively connected to the endless track to drive the endless track.

In some implementations, the snowmobile also includes: a primary pulley shaft defining the primary pulley rotation axis, the primary pulley being mounted to the primary pulley shaft to rotate therewith; and a secondary pulley shaft defining the secondary pulley rotation axis, the secondary pulley being mounted to the secondary pulley shaft to rotate therewith, the one of the chain and the belt being operatively connected between the primary pulley shaft and the shaft of the motor.

In some implementations, the primary and secondary pulley shafts are rotatably supported by the frame.

In some implementations, the primary pulley rotation axis extends laterally; and the primary pulley rotation axis is positioned forwardly of the shaft rotation axis of the shaft of the motor.

In some implementations, the secondary pulley rotation axis is positioned forwardly of the primary pulley rotation axis.

In some implementations, the secondary pulley is operatively connected to the drive sprocket of the rear suspension assembly by a link; and the primary and secondary pulleys of the CVT are disposed laterally between the link operatively connecting the secondary pulley to the drive sprocket and the one of the chain and the belt operatively connecting the primary pulley to the shaft of the motor.

In some implementations, the drive axle rotation axis is positioned rearwardly of the secondary pulley rotation axis.

In some implementations, the drive axle rotation axis is positioned rearwardly of the primary pulley rotation axis.

In some implementations, the secondary pulley rotation axis is vertically lower than the primary pulley rotation axis.

In some implementations, the ski is a single laterally centered ski.

In some implementations, the one of the chain and the belt is the chain. The snowmobile also includes: a first sprocket mounted to the shaft of the motor; and a second sprocket mounted to the primary pulley shaft. The chain is connected between the first and second sprockets to operatively connect the shaft of the motor to the primary pulley.

In some implementations, the second sprocket has a smaller diameter than the primary pulley.

In some implementations, the motor is an internal combustion engine, the shaft of the motor is a crankshaft and the shaft rotation axis of the shaft of the motor is a crankshaft rotation axis.

According to another aspect of the present technology, there is provided a snowmobile. The snowmobile includes: a frame; a ski connected to the frame; a seat connected to the frame for accommodating a driver of the snowmobile; a rear suspension assembly operatively connected to the frame; an endless track supported by the rear suspension assembly; a motor supported by the frame; and a continuously variable transmission (CVT) operatively connecting the motor to the endless track for driving the endless track. The rear suspension assembly includes: at least one slide rail; a suspension assembly drive axle defining a drive axle rotation axis; a drive sprocket mounted to the drive axle; and a plurality of idler wheels connected to the at least one slide rail. The drive sprocket of the rear suspension assembly is rotatable about the drive axle rotation axis to drive the endless track. The motor includes a shaft rotatable about a shaft rotation axis. The drive axle rotation axis is positioned forwardly of the shaft rotation axis of the shaft of the motor. The seat is positioned above the shaft rotation axis of the shaft of the motor.

In some implementations, the CVT includes a primary pulley operatively connected to and driven by the motor, a secondary pulley operatively connected to and driven by the primary pulley, and a transmission belt connecting the primary pulley to the secondary pulley. The primary pulley is rotatable about a primary pulley rotation axis, the primary pulley rotation axis extending parallel to the shaft rotation axis of the shaft of the motor, the primary pulley being operatively connected to the shaft of the motor by one of a chain and a belt. The secondary pulley is rotatable about a secondary pulley rotation axis. The secondary pulley is operatively connected to the endless track to drive the endless track.

According to another aspect of the present technology, there is provided a snowmobile. The snowmobile includes a frame; a ski connected to the frame; a seat connected to the frame for accommodating a driver of the snowmobile; a rear suspension assembly operatively connected to the frame; an endless track supported by the rear suspension assembly; an internal combustion engine supported by the frame; a continuously variable transmission (CVT) operatively connecting the engine to the endless track for driving the endless track; and a fuel tank supported by the frame and positioned rearwardly of the engine. The rear suspension assembly includes: at least one slide rail; a suspension assembly drive axle defining a drive axle rotation axis; a drive sprocket mounted to the drive axle; and a plurality of idler wheels connected to the at least one slide rail. The drive sprocket of the rear suspension assembly is rotatable about the drive axle rotation axis to drive the endless track. The engine includes a crankshaft rotatable about a crankshaft rotation axis. The drive axle rotation axis is positioned forwardly of the crankshaft rotation axis.

In some implementations, the fuel tank is positioned rearwardly of the seat.

In some implementations, the CVT includes a primary pulley operatively connected to and driven by the motor, a secondary pulley operatively connected to and driven by the primary pulley, and a transmission belt connecting the primary pulley to the secondary pulley. The primary pulley is rotatable about a primary pulley rotation axis, the primary pulley rotation axis extending parallel to the shaft rotation axis of the shaft of the motor, the primary pulley being operatively connected to the shaft of the motor by one of a chain and a belt. The secondary pulley is rotatable about a secondary pulley rotation axis. The secondary pulley is operatively connected to the endless track to drive the endless track.

In some implementations, the snowmobile also includes: a primary pulley shaft defining the primary pulley rotation axis, the primary pulley being mounted to the primary pulley shaft to rotate therewith; and a secondary pulley shaft defining the secondary pulley rotation axis, the secondary pulley being mounted to the secondary pulley shaft to rotate therewith, the one of the chain and the belt being operatively connected between the primary pulley shaft and the crankshaft.

For purposes of the present application, terms related to spatial orientation when referring to the snowmobile and components in relation to the snowmobile, such as "forward", "rearward", "left", "right", "above" and "below", are as they would be understood by a driver of the snowmobile sitting thereon in a normal riding position, with the snowmobile in a straight ahead orientation (i.e. not steered left or right), and in an upright position (i.e. not tilted). When referring to a component alone, terms related to spatial orientation are described with respect to the component as disposed on the snowmobile.

Implementations of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of implementations of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
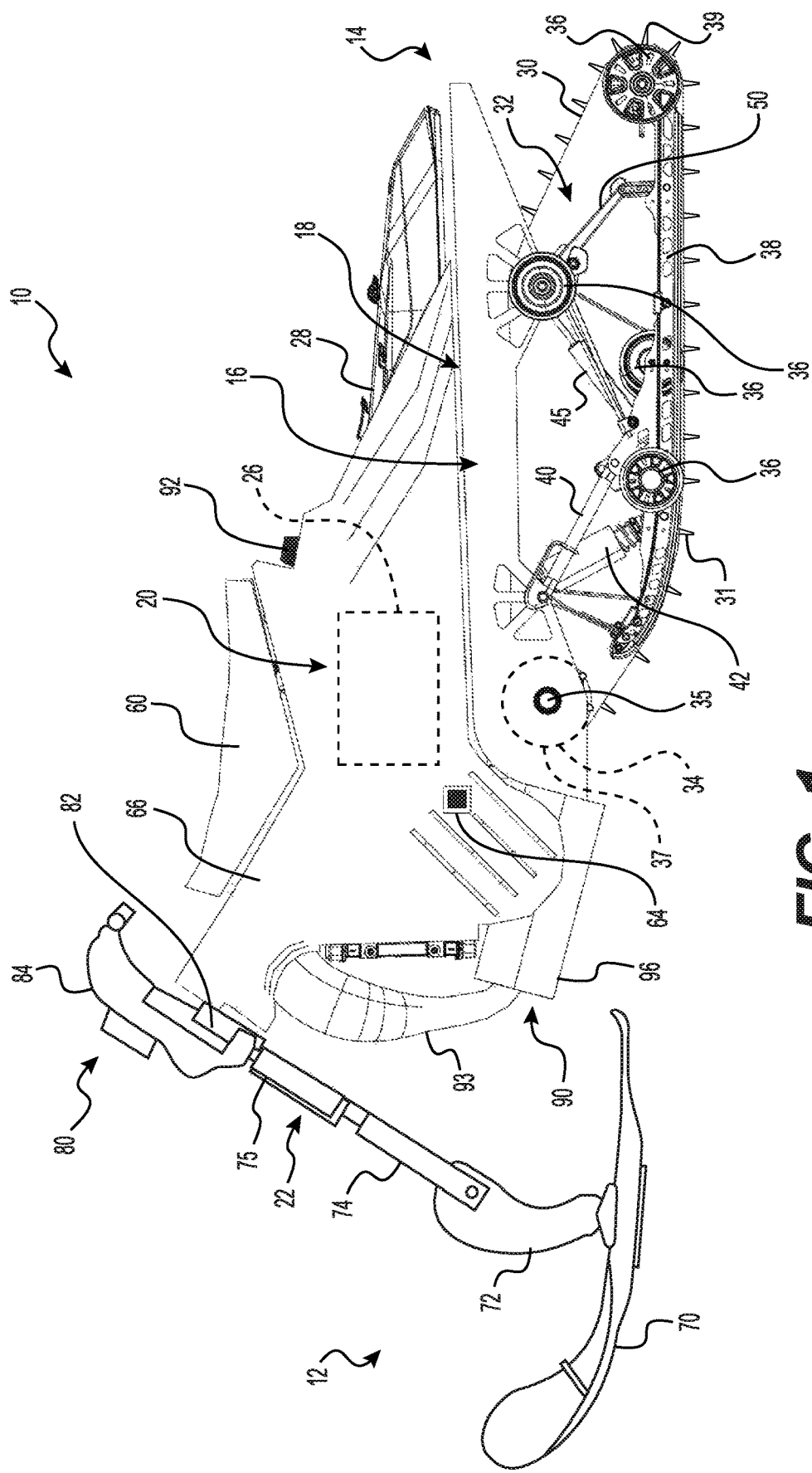
FIG. 1 is a left side elevation view of a snowmobile.

With reference to FIGS. 1 to 5, a snowmobile 10 includes a front end 12 and a rear end 14 which are defined consistently with a forward travel direction of the snowmobile 10. The snowmobile 10 includes a vehicle body in the form of a frame 16 which includes a rear tunnel 18 and a motor module 20. The tunnel 18 is formed from sheet metal parts assembled to form an inverted U-shape when viewed from the front or rear end 12, 14. The inverted U-shaped tunnel 18 has a left side portion 18a and a right side portion 18b.

A motor 26, which in the present implementation is an internal combustion engine (schematically illustrated in FIG. 1), is carried in a motor compartment defined in part by the motor module 20 of the frame 16. The engine 26 provides propulsion of the snowmobile 10. The internal construction of the engine 26 may be of any known type such as a two-stroke engine, a four-stroke engine or a diesel engine. It is contemplated that the engine 26 could be replaced by other types of motors, such as, but not limited to, an electric motor or an electric/internal combustion hybrid engine. In the present implementation, the engine 26 is a two-stroke, in-line, two cylinder internal combustion engine. The engine 26 has a crankshaft 86 that rotates about a crankshaft rotation axis 88 extending laterally (i.e. generally transversely to a longitudinal axis 15 of the snowmobile 10). As will be described in more detail further below, the crankshaft 86 drives a drivetrain of the snowmobile 10 for propulsion of the snowmobile 10 on the ground.

A fuel tank 28, supported on the tunnel 18, supplies fuel to the engine 26 for its operation. The fuel tank 28 includes a cap 92 covering a fill opening of the fuel tank 28 and disposed behind a seat 60 of the snowmobile 10.

The snowmobile 10 also comprises an exhaust system 90 for guiding exhaust gas away from the engine 26 to a surrounding environment of the snowmobile 10. Notably, the exhaust system 90 comprises an exhaust pipe 93 which is fluidly connected to the engine's exhaust ports 94, and a muffler 96 for reducing an amount of noise emitted by the exhaust system 90. The exhaust pipe 93 is a tuned pipe in that it has a geometry suitable for improving the efficiency of the engine 26.

An endless track 30 is positioned generally under the tunnel 18, and is operatively connected to the engine 26 via a drivetrain including a transmission system 23. The endless track 30 has a front end 37 and a rear end 39 opposite the front end 37. The endless track 30 is driven to run about a rear suspension assembly 32 connected to the frame 16 for propulsion of the snowmobile 10. The endless track 30 has a plurality of lugs 31 extending from an outer surface thereof to provide traction to the endless track 30.

The rear suspension assembly 32 includes a pair of drive sprockets 34 mounted on a drive axle 35, multiple idler wheels 36 and a pair of slide rails 38 in sliding contact with the endless track 30. The drive axle 35 on which the drive sprockets 34 are mounted defines a drive sprocket rotation axis 34a which extends laterally (i.e., in a lateral direction of the snowmobile 10). The slide rails 38 are attached to the tunnel 18 by a front suspension arm 40 and a rear suspension arm 50. The rear suspension assembly 32 further includes a front shock absorber assembly 42 and a rear shock absorber assembly 45, each of which includes a shock absorber. It is contemplated that the snowmobile 10 could be provided with a different implementation of the rear suspension assembly 32 than the one shown herein.

The seat 60 of the snowmobile 10 is a straddle seat which is connected to the frame 16 and is adapted to accommodate a driver of the snowmobile 10. In some implementations, the seat 60 may be configured to accommodate a passenger. A footrest 64 is positioned on each side of the snowmobile 10 below the seat 60 to accommodate the driver's feet. Each of the left and right footrests 64 extends generally laterally outwardly from corresponding left and right side portions of the frame 16.

The snowmobile 10 further comprises fairings 66 which enclose the engine 26, the transmission system 23 and other components of the powerpack such as an air intake system. The fairings 66 can be removed to allow access to the engine 26 and/or the transmission system 23 and other internal components of the snowmobile 10 which may be required, for example, for inspection or maintenance of the engine 26 and/or the powerpack.

Figure 3:
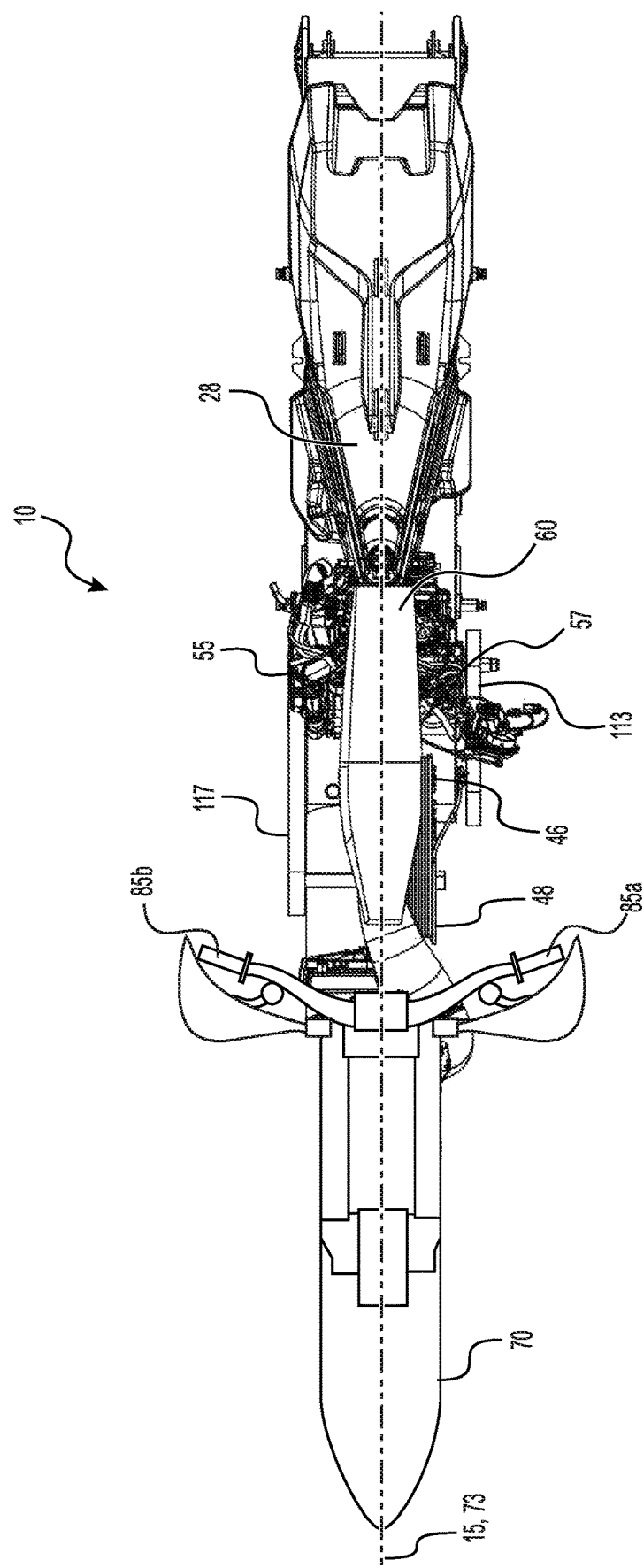
FIG. 3 is a top plan view of the snowmobile as shown in FIG. 2.
Figure 4:
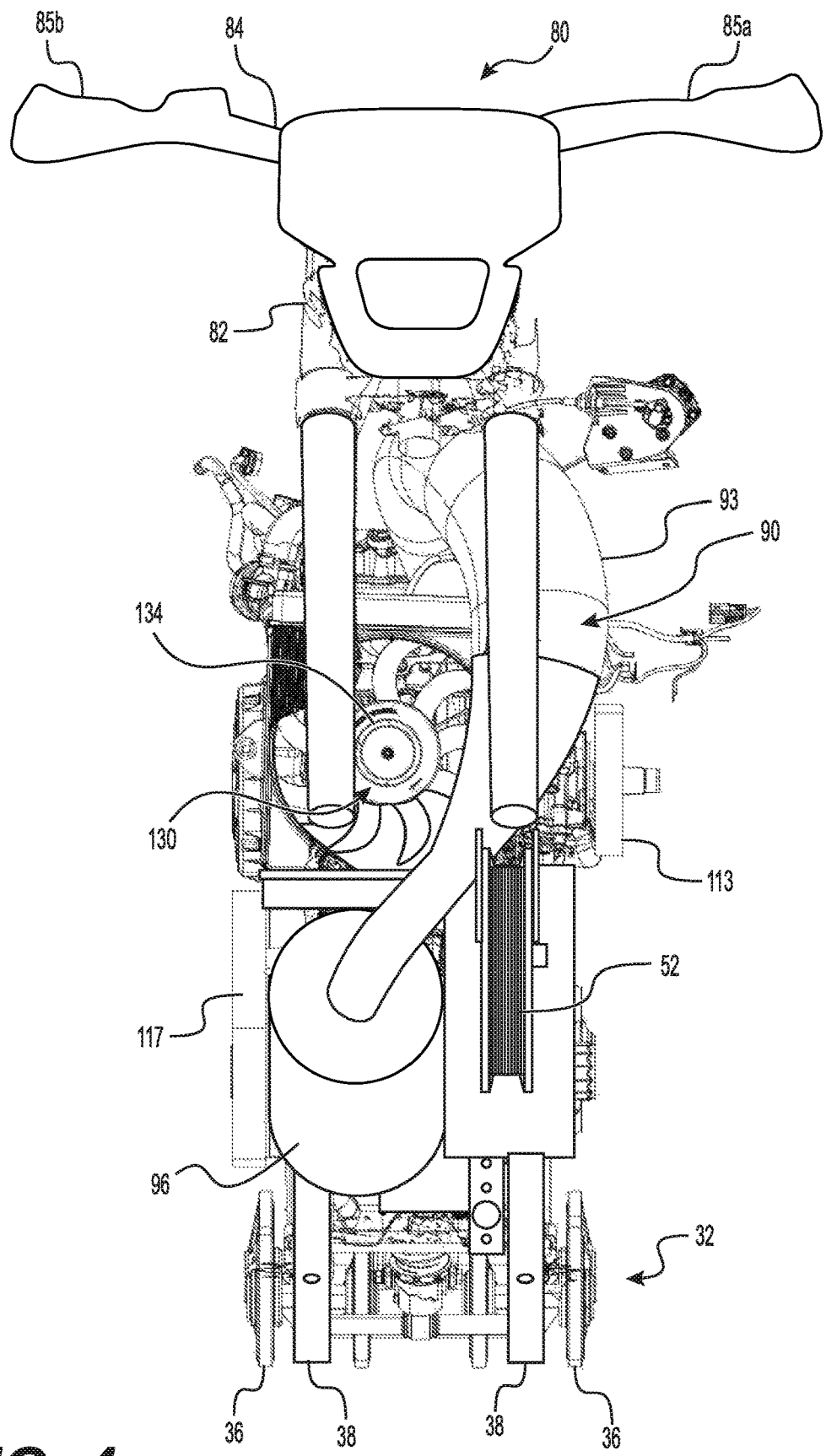
FIG. 4 is a front elevation view of the snowmobile as shown in FIG. 2.
Figure 5:
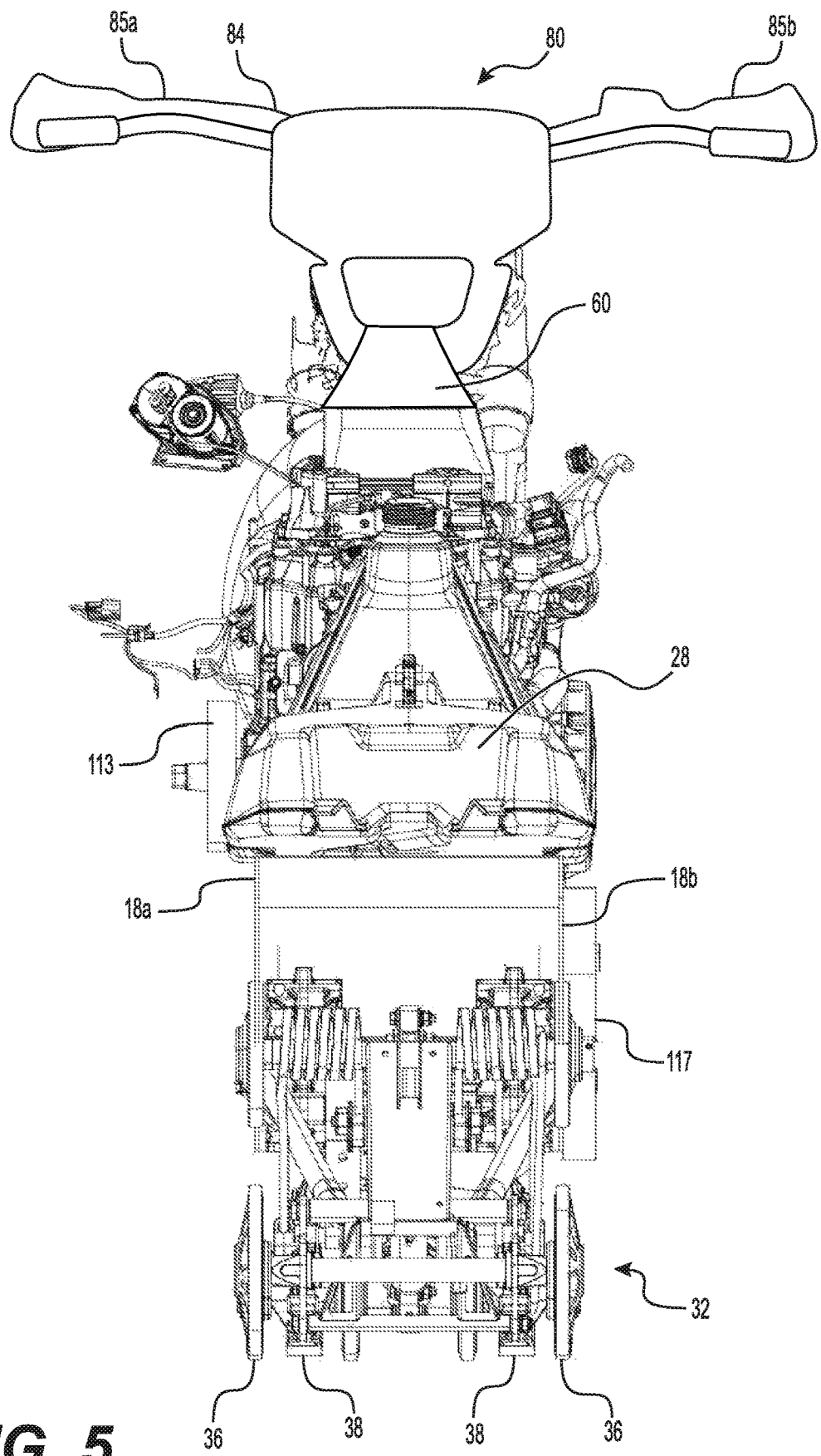
FIG. 5 is a rear elevation view of the snowmobile as shown in FIG. 2.

A ski 70 positioned at the forward end 12 of the snowmobile 10 is attached to the front suspension module 22 of the frame 16 through a spindle 72. The front suspension module 22 includes a fork 74 and a shock absorber 75. As shown in FIG. 3, the ski 70 is a single laterally centered ski. In other words, the ski 70 is aligned with a centerline 73 bisecting a width of the snowmobile 10. It is contemplated that, in some implementations, the snowmobile 10 may comprise two skis (such as the ski 70) which are positioned close to each other.

A steering assembly 80, including two front forks 82 and a handlebar 84, is provided generally forward of the seat 60. The front forks 82 are rotatably connected to the frame 16. A lower end of the front forks 82 is connected to the front suspension module 22. The handlebar 84 is attached to an upper end of the front forks 82. The handlebar 84 is positioned in front of the seat 60. The handlebar 84 is operatively connected to the ski 70 such that the handlebar 84 is used to rotate the front forks, and thereby the ski 70, in order to steer the snowmobile 10. A left handle 85a and a right handle 85b are disposed on left and right sides of the handlebar 84 respectively. A brake actuator (not shown), in the form of a hand brake lever, is provided on the left handle 85a for braking the snowmobile 10 in a known manner A throttle operator (not shown) in the form of a twist grip is mounted to the right handle 85b. Other types of throttle operators, such as a finger-actuated throttle lever and a thumb-actuated throttle lever, are also contemplated.

In this implementation, the snowmobile 10 also comprises a heat exchanger system 130 for cooling the engine 26. The heat exchanger system 130 comprises a radiator 132 and a fan 134. The radiator 132 is fluidly connected to the engine 26 such that coolant that is circulated through the engine 26 is received at the radiator 132 where the coolant exchanges heat and is returned to the engine 26. The fan 134 is configured to blow air through the radiator 132 to aid in the convective heat exchange.

The snowmobile 10 includes other components such as a display cluster, an air intake system, and the like. As it is believed that these components would be readily recognized by one of ordinary skill in the art, further explanation and description of these components will not be provided herein.

Figure 6:
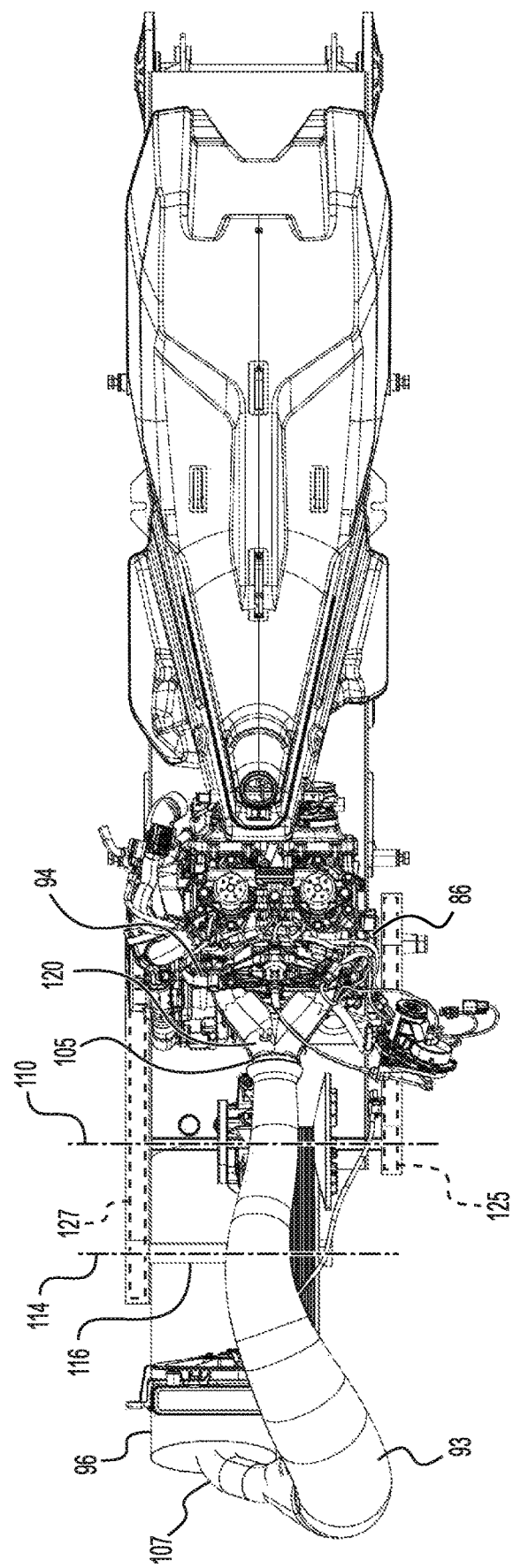
FIGS. 6 and 7 are top and bottom plan views of a portion of the snowmobile of FIG. 1 showing an exhaust system of the snowmobile.
Figure 7:
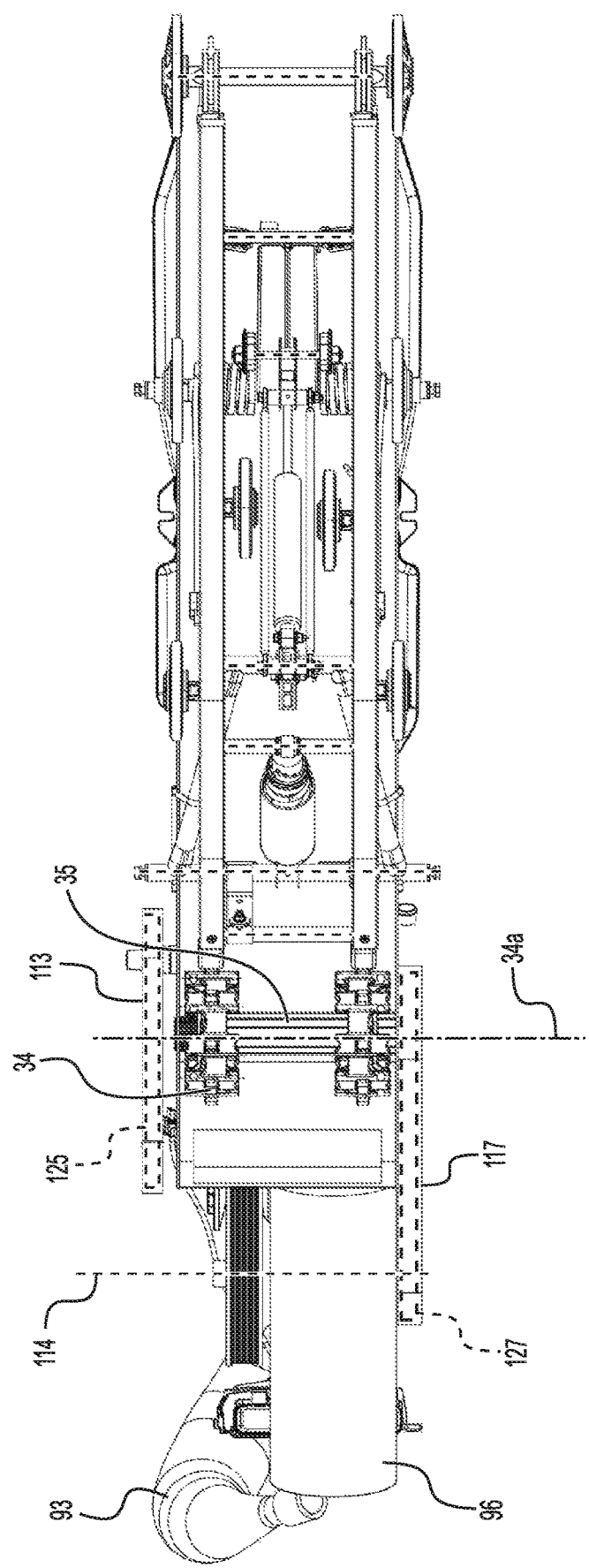
Figure 8:
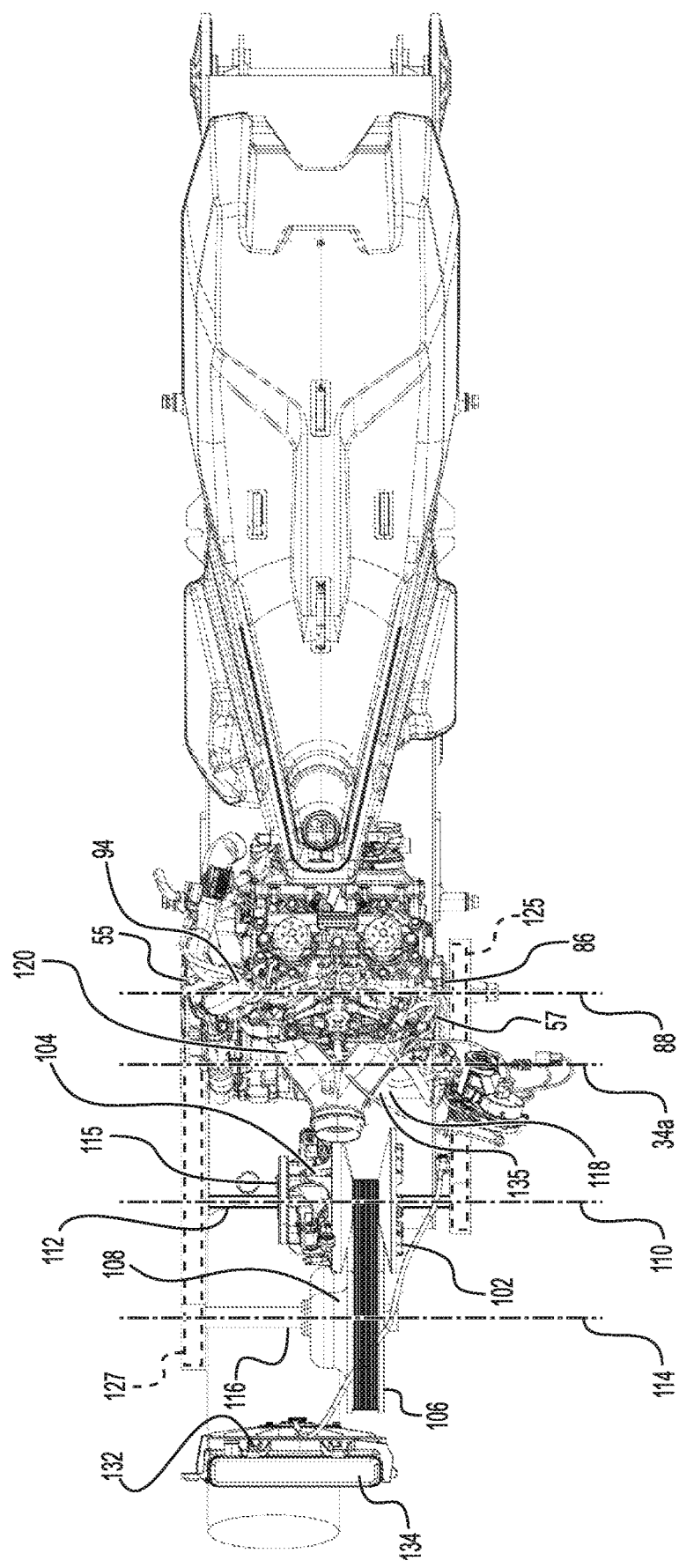
FIG. 8 is a top plan view of the portion of the snowmobile shown in FIGS. 6 and 7 with an exhaust pipe of the exhaust system removed to expose the continuous variable transmission of the snowmobile.

Turning now to FIGS. 6 to 8, the configuration of the transmission system 23 and the engine 26 will now be described in more detail.

The transmission system 23 is a continuously variable transmission (CVT) and thus offers a continuous range of gear ratios. To that end, the CVT 23 comprises a primary (drive) pulley 46 operatively connected to the engine 26, a secondary (driven) pulley 48 operatively connected to the endless track 30, and a transmission belt 52 which operatively connects the primary pulley 46 to the secondary pulley 48. More particularly, the primary pulley 46 has a pair of opposed frustoconical belt drive sheaves 102, 104 and the secondary pulley 48 has a pair of opposed frustoconical belt drive sheaves 106, 108. The transmission belt 52 is located between the opposed pairs of drive sheaves 102, 104 and 106, 108.

A transmission ratio of the CVT 23 can be changed by moving the sheaves of one of the primary and secondary pulleys 46, 48 closer together and the sheaves of the other of the primary and secondary pulleys 46, 48 further apart. This causes the transmission belt 52 to ride higher on one pulley and lower on the other, thus affecting the transmission ratio of the CVT 23. In order to effect such a change in the transmission ratio of the CVT 23, the primary pulley 46 has centrifugal actuators 115 connected to the drive sheave 104 which is moveable laterally (i.e., in an axial direction of the primary pulley 46) towards and away from the drive sheave 102 which is laterally fixed. As is known, the centrifugal actuators 115 generally consist of centrifugal weights in the form of adjusting arms. Each of the arms is connected to the movable sheave 104 of the primary pulley 46 by a pin, and pivots outwards about its corresponding pin. As they pivot, the arms are in contact with corresponding rollers disposed on a spider fixed relative to the movable sheave 104. When the adjusting arms pivot outwards as a result of centrifugal force, they slide against their corresponding roller and the axially movable sheave 104 is pushed towards the fixed sheave 102.

The primary pulley 46 has a primary pulley rotation axis 110 extending laterally and which is defined by a primary pulley shaft 112 onto which the primary pulley 46 is mounted. The primary pulley shaft 112 is rotatably supported by the frame 16 (e.g., via bearings). The primary pulley 46 is rotatable with the primary pulley shaft 112 such that the drive sheaves 102, 104 rotate together with the primary pulley shaft 112. The primary pulley 46 is operatively connected to the crankshaft 86 of the engine 26. In particular, in this implementation, a sprocket 122 is mounted on the primary pulley shaft 112 and another sprocket 124 is mounted on the crankshaft 86. A chain 125 operatively connects the sprocket 124 mounted on the crankshaft 86 to the sprocket 122 mounted on the primary pulley shaft 112 such that the crankshaft 86 transmits torque to the primary pulley 46 via the chain 125 and sprockets 122, 124 and thus causes rotation of the primary pulley 46 about the primary pulley rotation axis 110. A chain case 113 covers the chain 125 and sprockets 122, 124. While in this implementation, a link interconnecting the crankshaft 86 to the primary pulley shaft 112 is a chain, the link may be any other suitable type of link in other implementations. For instance, it is contemplated that, in other implementations, instead of sprockets, pulleys are mounted on the crankshaft 86 and the primary pulley shaft 112 and a belt is looped about the pulleys such that the crankshaft 86 transmits torque to the primary pulley 46 via the belt and pulleys. It is contemplated that, in yet other implementations, a gear is mounted on the crankshaft 86 and another gear is mounted on the primary pulley shaft 112. The gear mounted on the crankshaft 86 drives the gear mounted on the primary pulley shaft 112 either directly, or through an intervening component, such as an idler gear.

Figure 2:
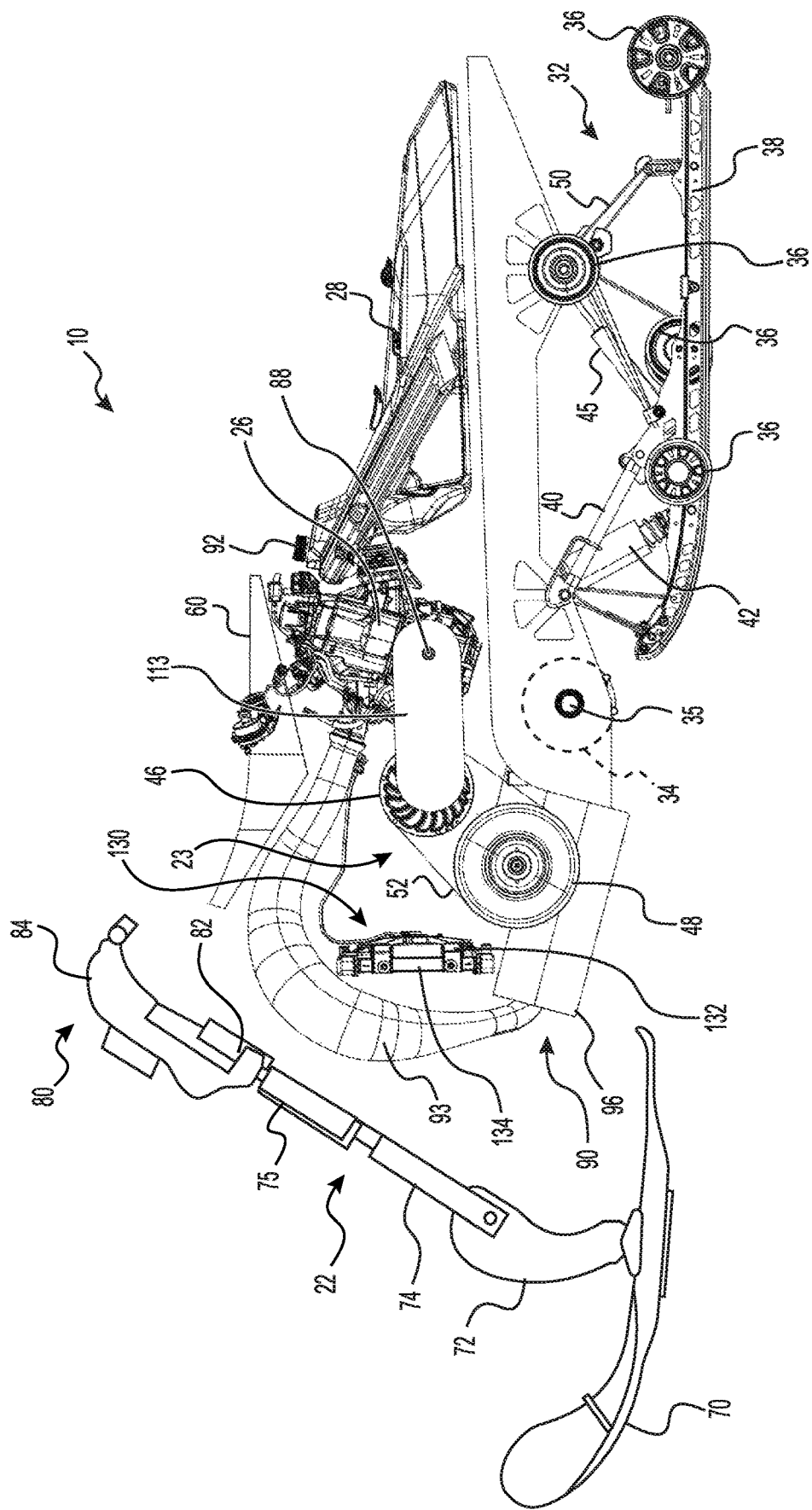
FIG. 2 is a left side elevation view of the snowmobile of FIG. 1 with certain components removed to expose part of a frame, an engine and a continuous variable transmission of the snowmobile.

As mentioned above, the transmission belt 52 operatively connects the primary pulley 46 to the secondary pulley 48 to transmit torque thereto. In particular, as shown in FIG. 2, the transmission belt 52 is looped around both the primary pulley 46 and the secondary pulley 48. In this implementation, the transmission belt 52 is made of rubber, but it is contemplated that it could be made of metal linkages or of a polymer.

The secondary pulley 48 has a secondary pulley rotation axis 114 extending laterally and which is defined by a secondary pulley shaft 116 onto which the secondary pulley 48 is mounted. The secondary pulley shaft 116 is rotatably supported by the frame 16 (e.g., via bearings). The secondary pulley 48 is rotatable with the secondary pulley shaft 116 such that the drive sheaves 106, 108 rotate together with the primary pulley shaft 112. The secondary pulley 48 is operatively connected to the drive sprockets 34 of the rear suspension assembly 32 such that the secondary pulley 48 transmits torque to the drive sprockets 34 which in turn drive the endless track 30. In this implementation, a sprocket 126 is mounted on the secondary pulley shaft 116 and another sprocket 128 is mounted on the drive axle 35. A chain 127 operatively connects the sprocket 126 mounted on the secondary pulley shaft 116 to the sprocket 128 mounted on the drive axle 35 such that the secondary pulley shaft 116 transmits torque to the drive axle 35 via the chain 127 and sprockets 126, 128 and thus causes rotation of the drive sprockets 34 about the drive sprocket rotation axis 34*a*. A chain case 117 covers the chain 127 and sprockets 126, 128. While in this implementation, a link interconnecting the secondary pulley shaft 116 to the drive axle 35 is a chain, the link may be any other suitable type of link in other implementations. For instance, it is contemplated that, in other implementations, instead of sprockets, pulleys are mounted on the secondary pulley shaft 116 and the drive axle 35 and a belt is looped about the pulleys such that the secondary pulley shaft 116 transmits torque to the drive axle 35 via the belt and pulleys. It is contemplated that, in yet other implementations, a gear is mounted on the secondary pulley shaft 116 and another gear is mounted on the drive axle 35. The gear mounted on the secondary pulley shaft 116 drives the gear mounted on the drive axle 35 either directly, or through an intervening component, such as an idler gear.

Figure 9:
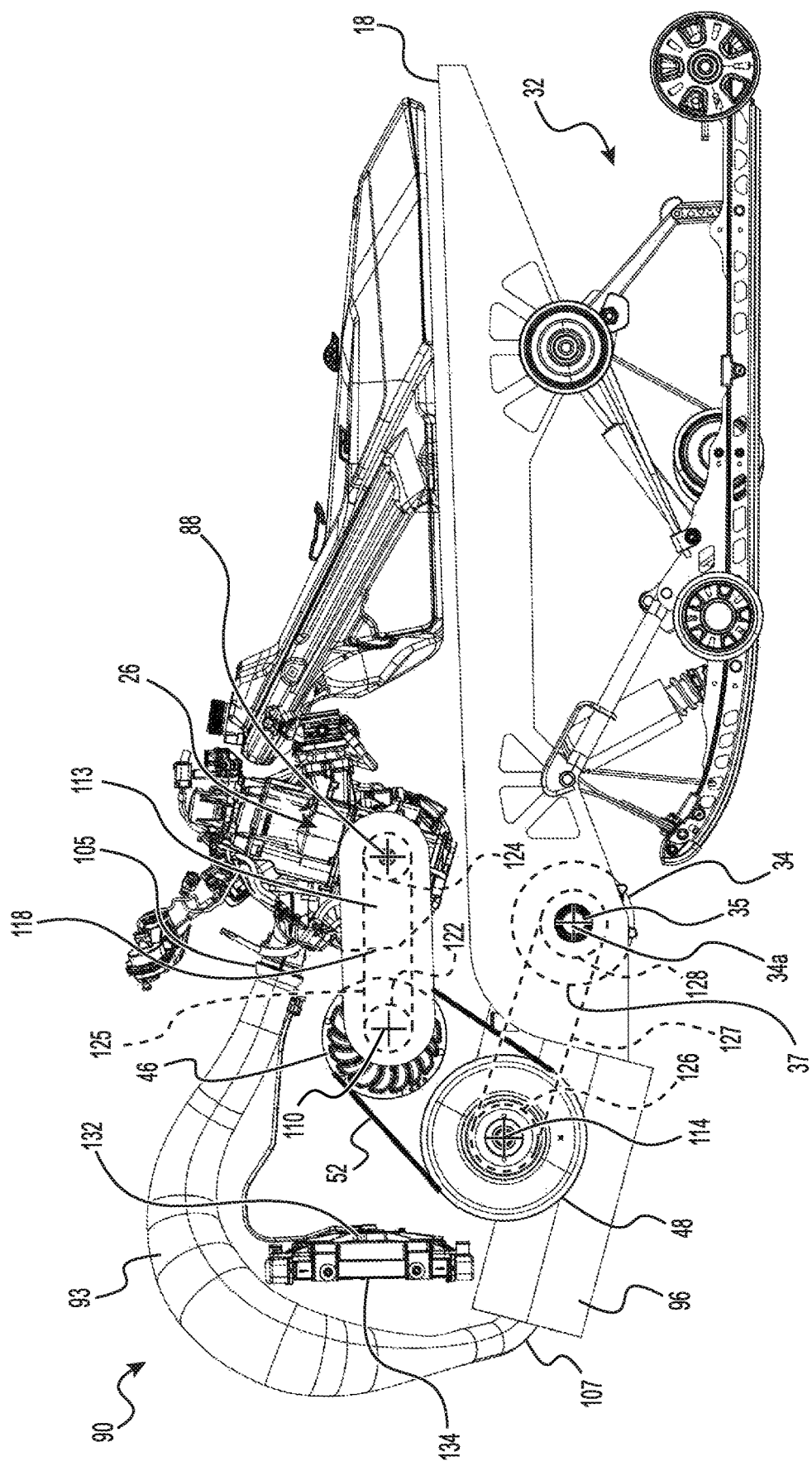
FIG. 9 is a left side elevation view of the portion of the snowmobile shown in FIG. 6.

With reference to FIGS. 7 to 9, in this implementation, the sprockets 122, 124 and the chain 125 are disposed on a right side of the CVT 23 while the sprockets 126, 128 and the chain 127 are disposed on a left side of the CVT 23. More specifically, the primary pulley 46, the secondary pulley 48 and the transmission belt 52 are positioned laterally between, on one lateral side thereof, the sprockets 122, 124 and the chain 125 which operatively connect the engine 26 to the CVT 23, and on the other lateral side, the sprockets 126, 128 and the chain 127 which operatively connect the CVT 23 to the drive axle 35. In implementations in which pulleys and a belt or other types of drive members (e.g., gears) operatively connect the engine 26 to the CVT 23 and/or the CVT 23 to the drive axle 35, the primary pulley 46 and the secondary pulley 48 are positioned laterally between the drive members that operatively connect the engine 26 to the CVT 23 and the drive members that operatively connect the CVT 23 to the drive axle 35.

As shown in FIGS. 8 and 9, the CVT 23 is positioned forwardly of the engine 26. In other words, a front end 118 of the engine 26 (i.e., a front surface 135 of a cylinder block and crankcase of the engine 26) is disposed rearwardly of the CVT 23 including the primary pulley 46, the secondary pulley 48 and the transmission belt 52. This positioning of the CVT 23 relative to the engine 26 may help minimize a combined lateral extent of the engine 26 and the CVT 23 which, conventionally, are positioned side-by-side (i.e., laterally adjacent).

The primary and secondary pulleys 46, 48 of the CVT 23 are therefore positioned between lateral sides 55, 57 of the engine 26. That is, the primary and secondary pulleys 46, 48 are confined within a lateral extent of the engine 26. Furthermore, the rotation axes 110, 114 of the primary and secondary pulleys 46, 48 of the CVT 23 are both located forwardly of the engine 26. In other words, the primary pulley rotation axis 110 is positioned forwardly of the crankshaft rotation axis 88. Similarly, the secondary pulley rotation axis 114 is positioned forwardly of the crankshaft rotation axis 88. Moreover, the secondary pulley rotation axis 114 is positioned forwardly of the primary pulley rotation axis 110. The secondary pulley rotation axis 114 is also vertically lower than the primary pulley rotation axis 110.

For its part, the engine 26 is positioned further rearward than in conventional snowmobile designs. This distributes a greater proportion of weight of the snowmobile 10 and its driver onto the endless track 30 rather than the ski 70 which may result in improved maneuvering of the snowmobile 10 when travelling over deep snow.

For instance, in this implementation, the engine 26 is fully positioned above (i.e. an entirety of the engine 26 is positioned above) the endless track 30 and rearward of the front end 37 of the endless track 30. However, it is contemplated that, in some implementations, rather than the entirety, a majority of the engine 26 is positioned above the endless track 30 and rearward of the front end 37 of the endless track 30, or that only part of the engine 26 is positioned above the endless track 30 and rearward of the front end 37 of the endless track 30. Moreover, the drive sprocket rotation axis 34a is positioned forwardly of the crankshaft rotation axis 88. Furthermore, the seat 60 is positioned above the engine 26. The engine 26 is positioned above the tunnel 18 of the frame 16.

Furthermore, the exhaust system 90 of the snowmobile 10 is positioned forwardly of the engine 26. More specifically, the exhaust pipe 93 has an end 105 and an end 107. The end 105 of the exhaust pipe 93 is fluidly connected to exhaust ports 94 of the engine 26 via an exhaust manifold 120 of the exhaust system 90. The end 105 is positioned rearwardly of the primary pulley rotation axis 110. The exhaust pipe 93 extends forwardly from the end 105 of the exhaust pipe 93 past the secondary pulley rotation axis 114.

The muffler 96 is fluidly connected to the end 107 of the exhaust pipe 93. The muffler 96 is positioned particularly low relative to the CVT 23. Notably, in this implementation, part of the muffler 96 extends below the secondary pulley rotation axis 114. Thus, as shown in FIG. 9, the exhaust pipe 93 extends forward from the end 105 of the exhaust pipe 93 past the secondary pulley 48 and downward in front of the secondary pulley 48 where the end 107 of the exhaust pipe 93 is connected to the muffler 96. The muffler 96 then extends rearward under the secondary pulley 48 from the end 107 of the exhaust pipe 93.

The radiator 132 and the fan 134 of the heat exchanger system 130 are positioned forwardly of the CVT 23. More specifically, as shown in FIGS. 8 and 9, the radiator 132 and the fan 134 are positioned forwardly of the secondary pulley 48. The exhaust pipe 93 extends forward from the end 105 of the exhaust pipe 93 past the radiator 132 and the fan 134 and downward past the radiator 132 and the fan 134 where the end 107 of the exhaust pipe 93 is connected to the muffler 96. The muffler 96 then extends rearward under the radiator 132 and the fan 134 from the end 107 of the exhaust pipe 93 and past the radiator 132 and the fan 134.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A snowmobile comprising:
 a frame;
 a ski connected to the frame;
 a seat connected to the frame for accommodating a driver of the snowmobile;
 a rear suspension assembly operatively connected to the frame, the rear suspension assembly comprising:
  at least one slide rail;
  a suspension assembly drive axle defining a drive axle rotation axis;
  a drive sprocket mounted to the drive axle; and
  a plurality of idler wheels connected to the at least one slide rail;
 an endless track supported by the rear suspension assembly, the drive sprocket of the rear suspension assembly being rotatable about the drive axle rotation axis to drive the endless track;
 a motor supported by the frame, the motor comprising a shaft rotatable about a shaft rotation axis, the drive axle rotation axis being positioned forwardly of the shaft rotation axis of the shaft of the motor, the seat being positioned above the motor; and
 a continuously variable transmission (CVT) operatively connecting the motor to the endless track for driving the endless track.

2. The snowmobile of claim 1, wherein the CVT comprises:
 a primary pulley operatively connected to and driven by the motor, the primary pulley being rotatable about a primary pulley rotation axis, the primary pulley rotation axis extending parallel to the shaft rotation axis of the shaft of the motor, the primary pulley being operatively connected to the shaft of the motor by one of:
  a chain; and
  a belt;
 a secondary pulley operatively connected to and driven by the primary pulley, the secondary pulley being rotatable about a secondary pulley rotation axis, the secondary pulley being operatively connected to the endless track to drive the endless track; and
 a transmission belt connecting the primary pulley to the secondary pulley.

3. The snowmobile of claim 2, further comprising:
 a primary pulley shaft defining the primary pulley rotation axis, the primary pulley being mounted to the primary pulley shaft to rotate therewith; and
 a secondary pulley shaft defining the secondary pulley rotation axis, the secondary pulley being mounted to the secondary pulley shaft to rotate therewith,
 the one of the chain and the belt being operatively connected between the primary pulley shaft and the shaft of the motor.

4. The snowmobile of claim 3, wherein the primary and secondary pulley shafts are rotatably supported by the frame.

5. The snowmobile of claim 2, wherein:
 the primary pulley rotation axis extends laterally; and
 the primary pulley rotation axis is positioned forwardly of the shaft rotation axis of the shaft of the motor.

6. The snowmobile of claim 2, wherein the secondary pulley rotation axis is positioned forwardly of the primary pulley rotation axis.

7. The snowmobile of claim 2, wherein:
 the secondary pulley is operatively connected to the drive sprocket of the rear suspension assembly by a link; and
 the primary and secondary pulleys of the CVT are disposed laterally between the link operatively connecting the secondary pulley to the drive sprocket and the one of the chain and the belt operatively connecting the primary pulley to the shaft of the motor.

8. The snowmobile of claim 2, wherein the drive axle rotation axis is positioned rearwardly of the secondary pulley rotation axis.

9. The snowmobile of claim 8, wherein the drive axle rotation axis is positioned rearwardly of the primary pulley rotation axis.

10. The snowmobile of claim 2, wherein the secondary pulley rotation axis is vertically lower than the primary pulley rotation axis.

11. The snowmobile of claim 1, wherein the ski is a single laterally centered ski.

12. The snowmobile of claim 3, wherein:
the one of the chain and the belt is the chain;
the snowmobile further comprises:
a first sprocket mounted to the shaft of the motor; and
a second sprocket mounted to the primary pulley shaft; and
the chain is connected between the first and second sprockets to operatively connect the shaft of the motor to the primary pulley.

13. The snowmobile of claim 12, wherein the second sprocket has a smaller diameter than the primary pulley.

14. The snowmobile of claim 1, wherein:
the motor is an internal combustion engine; and
the shaft of the motor is a crankshaft and the shaft rotation axis of the shaft of the motor is a crankshaft rotation axis.

15. A snowmobile comprising:
a frame;
a ski connected to the frame;
a seat connected to the frame for accommodating a driver of the snowmobile;
a rear suspension assembly operatively connected to the frame, the rear suspension assembly comprising:
at least one slide rail;
a suspension assembly drive axle defining a drive axle rotation axis;
a drive sprocket mounted to the drive axle; and
a plurality of idler wheels connected to the at least one slide rail;
an endless track supported by the rear suspension assembly, the drive sprocket of the rear suspension assembly being rotatable about the drive axle rotation axis to drive the endless track;
a motor supported by the frame, the motor comprising a shaft rotatable about a shaft rotation axis, the drive axle rotation axis being positioned forwardly of the shaft rotation axis of the shaft of the motor, the seat being positioned above the shaft rotation axis of the shaft of the motor; and
a continuously variable transmission (CVT) operatively connecting the motor to the endless track for driving the endless track.

16. The snowmobile of claim 15, wherein the CVT comprises:
a primary pulley operatively connected to and driven by the motor, the primary pulley being rotatable about a primary pulley rotation axis, the primary pulley rotation axis extending parallel to the shaft rotation axis of the shaft of the motor, the primary pulley being operatively connected to the shaft of the motor by one of:
a chain; and
a belt;
a secondary pulley operatively connected to and driven by the primary pulley, the secondary pulley being rotatable about a secondary pulley rotation axis, the secondary pulley being operatively connected to the endless track to drive the endless track; and
a transmission belt connecting the primary pulley to the secondary pulley.

17. A snowmobile comprising:
a frame;
a ski connected to the frame;
a seat connected to the frame for accommodating a driver of the snowmobile;
a rear suspension assembly operatively connected to the frame, the rear suspension assembly comprising:
at least one slide rail;
a suspension assembly drive axle defining a drive axle rotation axis;
a drive sprocket mounted to the drive axle; and
a plurality of idler wheels connected to the at least one slide rail;
an endless track supported by the rear suspension assembly, the drive sprocket of the rear suspension assembly being rotatable about the drive axle rotation axis to drive the endless track;
an internal combustion engine supported by the frame, the engine comprising a crankshaft rotatable about a crankshaft rotation axis, the drive axle rotation axis being positioned forwardly of the crankshaft rotation axis;
a continuously variable transmission (CVT) operatively connecting the engine to the endless track for driving the endless track; and
a fuel tank supported by the frame and positioned rearwardly of the engine.

18. The snowmobile of claim 17, wherein the fuel tank is positioned rearwardly of the seat.

19. The snowmobile of claim 17, wherein the CVT comprises:
a primary pulley operatively connected to and driven by the engine, the primary pulley being rotatable about a primary pulley rotation axis, the primary pulley rotation axis extending parallel to the crankshaft rotation axis, the primary pulley being operatively connected to the crankshaft by one of:
a chain; and
a belt;
a secondary pulley operatively connected to and driven by the primary pulley, the secondary pulley being rotatable about a secondary pulley rotation axis, the secondary pulley being operatively connected to the endless track to drive the endless track; and
a transmission belt connecting the primary pulley to the secondary pulley.

20. The snowmobile of claim 19, further comprising:
a primary pulley shaft defining the primary pulley rotation axis, the primary pulley being mounted to the primary pulley shaft to rotate therewith; and
a secondary pulley shaft defining the secondary pulley rotation axis, the secondary pulley being mounted to the secondary pulley shaft to rotate therewith,
the one of the chain and the belt being operatively connected between the primary pulley shaft and the crankshaft.

* * * * *